(12) United States Patent
Ichise et al.

(10) Patent No.: US 12,420,429 B2
(45) Date of Patent: Sep. 23, 2025

(54) CONTROL PANEL FOR AUTOMATED SYSTEM, AND ROBOT SYSTEM

(71) Applicant: KAWASAKI JUKOGYO KABUSHIKI KAISHA, Kobe (JP)

(72) Inventors: Takuya Ichise, Kobe (JP); Hiroshi Takada, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 232 days.

(21) Appl. No.: 18/033,723

(22) PCT Filed: Oct. 15, 2021

(86) PCT No.: PCT/JP2021/038253
§ 371 (c)(1),
(2) Date: Apr. 25, 2023

(87) PCT Pub. No.: WO2022/091818
PCT Pub. Date: May 5, 2022

(65) Prior Publication Data
US 2023/0302655 A1 Sep. 28, 2023

(30) Foreign Application Priority Data
Oct. 28, 2020 (JP) .................................. 2020-180965

(51) Int. Cl.
*B25J 13/06* (2006.01)
*G06F 3/041* (2006.01)

(52) U.S. Cl.
CPC .............. *B25J 13/06* (2013.01); *G06F 3/041* (2013.01)

(58) Field of Classification Search
CPC .......... B25J 13/06; B25J 9/1602; B25J 19/00; G06F 3/041; H04L 69/168; H04L 12/40045; H04L 67/125; H04L 69/321; H04L 69/323; H04L 69/324; H04L 12/10; Y02P 90/02; G05B 19/41855; G05B 19/409
USPC ........................................................ 700/264
See application file for complete search history.

(56) References Cited

U.S. PATENT DOCUMENTS

| | | | |
|---|---|---|---|
| 2008/0274646 A1* | 11/2008 | Schoop | H01Q 1/2266 439/620.23 |
| 2016/0020910 A1* | 1/2016 | Jones | H04L 12/10 370/218 |

FOREIGN PATENT DOCUMENTS

| | | | |
|---|---|---|---|
| CN | 208506722 U | * | 2/2019 |
| EP | 3 646 997 A2 | | 5/2020 |
| JP | 2010-167550 A | | 8/2010 |
| JP | 2014-144495 A | | 8/2014 |
| JP | 2020-99953 A | | 7/2020 |

OTHER PUBLICATIONS

Bu (CN208506722); Learning-oriented touch panel of POE power supply; Shenzhen Hitouch Tech Co Ltd (Year: 2019).*

* cited by examiner

*Primary Examiner* — B M M Hannan
(74) *Attorney, Agent, or Firm* — Oliff PLC

(57) ABSTRACT

A control panel includes a first controller that performs communication in conformity with an Ethernet standard with a first device via a field network, a second controller that performs safety communication in conformity with an Ethernet standard with a second device that uses a safety signal, a PoE hub that performs PoE power supply to the first device or the second device, and a LAN terminal to which a LAN cable is connected.

7 Claims, 2 Drawing Sheets

CONTROL PANEL FOR AUTOMATED SYSTEM, AND ROBOT SYSTEM

FIELD

The technique disclosed herein relates to a control panel for an automated system and a robot system.

BACKGROUND

For example, Patent Document 1 discloses a control panel for an automated system. A robot, a robot peripheral apparatus, an emergency stop switch, a safety fence switch, etc. are connected to the control panel.

CITATION LIST

Patent Document

Patent Document 1: Japanese Unexamined Patent Application Publication No. 2014-144495

SUMMARY

Various devices are connected to the above-described control panel via cables. Thus, the number of cables is great for the control panel to which many devices are connected.

For this reason, when the control panel is installed on site, many cables need to be connected, and a great number of steps is required. Moreover, the control panel needs to include terminals for various cables for devices in advance, and the control panel is large.

The technique disclosed herein has been made in view of the above-described points, and an object thereof is to reduce the number of steps of connecting the cables to the control panel and reduce the control panel in size.

A control panel for an automated system as disclosed herein includes a first controller that performs communication in conformity with an Ethernet standard with a first device via a field network, a second controller that performs safety communication in conformity with an Ethernet standard with a second device that uses a safety signal, a power supplier that performs PoE power supply to the first device or the second device, and a LAN terminal to which the first controller, the second controller, and the power supplier are connected and to which a LAN cable is connected.

A robot system disclosed herein includes the control panel for the automated system, the first device, and the second device.

According to the control panel for the automated system, the number of steps of connecting the cables to the control panel can be reduced, and the control panel can be reduced in size.

According to the robot system, the number of steps of connecting the cables to the control panel can be reduced, and the control panel can be reduced in size.

DESCRIPTION OF EMBODIMENTS

Hereinafter, an exemplary embodiment will be described in detail based on the drawings.

Figure 1:
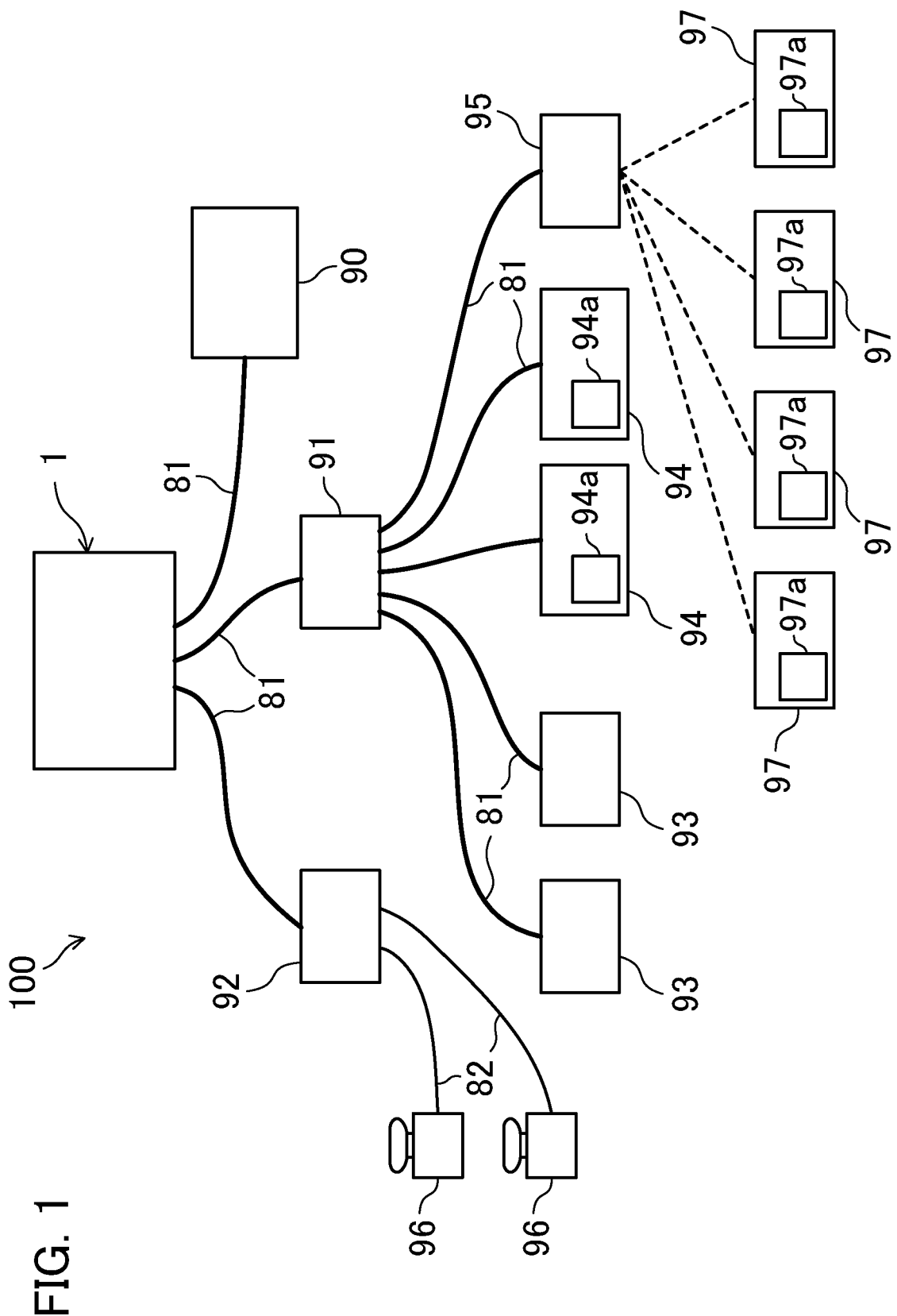
FIG. 1 is a schematic diagram showing the configuration of an automated system.

FIG. 1 is a schematic diagram showing the configuration of an automated system 100. The automated system 100 includes a control panel 1 and devices 90 to 98. The control panel 1 controls the devices 90 to 98. The control panel 1 controls the automated system 100 in an integrated manner. The automated system 100 is one example of a robot system.

The device 90 is a personal computer (PC). The device 91 is a switching hub. The device 92 is a safety IO box. The device 93 is an IO box. The device 94 is a robot controller. The device 95 is a wireless router. The device 96 is a safety switch. The device 97 is a self-propelled robot.

Note that in description below, a specific device name will be sometimes used instead of the "device," as necessary. For example, the "PC 90" will be sometimes used instead of the "device 90."

The switching hub 91 and the safety IO box 92 are directly connected, using LAN cables 81, to the control panel 1. The IO boxes 93, the robot controllers 94, and the wireless router 95 are directly connected, using LAN cables 81, to the switching hub 91. The safety switches 96 are directly connected, using cables 82, to the safety IO box 92. Robot controllers 97a built in the self-propelled robots 97 are connected to the wireless router 95 via a wireless LAN.

The control panel 1 performs standard communication (general-purpose communication) and safety communication on the same field network. That is, the control panel 1 performs safety communication with a device that uses a safety signal to execute safety control, and performs communication with a standard device that uses a general-purpose signal, such as a field device, to execute standard control. For example, the control panel 1 checks the safety of the automated system 100 by the safety control. Moreover, the control panel 1 outputs, e.g., a command signal causing the field device to prepare for operation or a command signal allowing the field device to operate.

Figure 2:
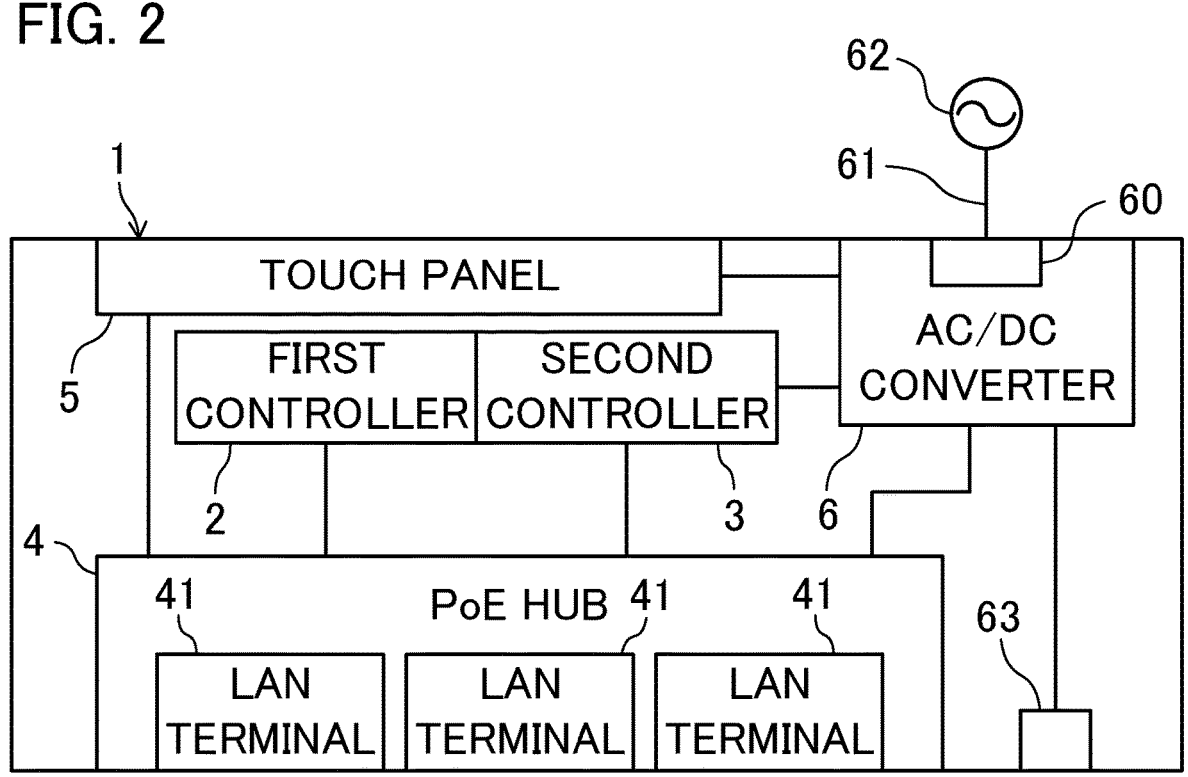
FIG. 2 is a block diagram showing the configuration of a control panel.

FIG. 2 is a block diagram showing the configuration of the control panel 1. The control panel 1 includes a first controller 2, a second controller 3, and a PoE hub 4 that performs a power-over-Ethernet (PoE) power supply to a device. The control panel 1 may include a touch panel 5 and an AC/DC converter 6.

The first controller 2 performs communication in conformity with an Ethernet standard, i.e., Ethernet-based communication, with a first device via the field network. The communication in conformity with the Ethernet standard by the first controller 2 is, for example, communication in conformity with an EtherNet/IP standard. That is, the first controller 2 communicates with the first device via the LAN cable 81. For example, the first controller 2 is a general-purpose programmable logic controller (PLC). The first device is a device that transmits and receives the general-purpose signal (i.e., a signal which is not the safety signal) in the automated system. In this example, the first device includes the switching hub 91, the safety IO box 92, the IO box 93, the robot controller 94, the wireless router 95, and the self-propelled robot 97. The first controller 2 performs general-purpose IO communication with these devices.

Figure 3:
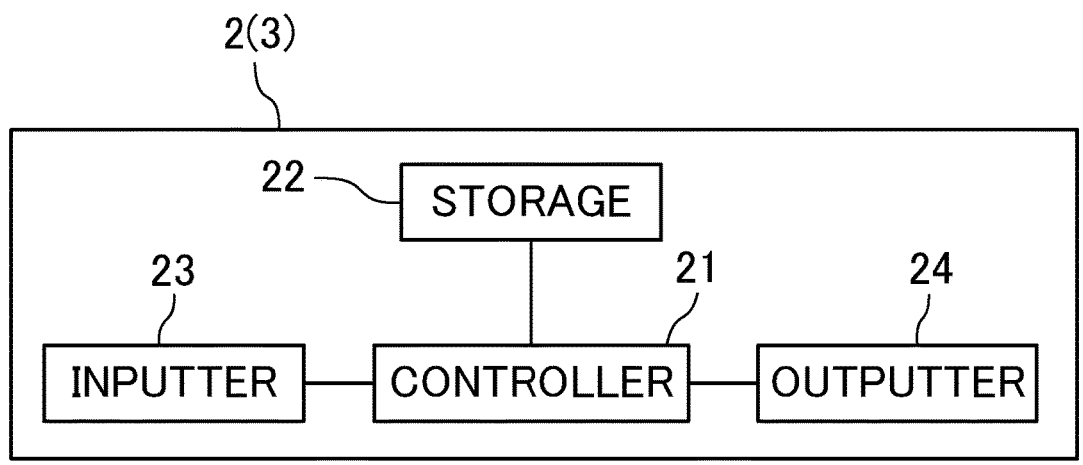
FIG. 3 is a block diagram showing the configuration of a first controller.

FIG. 3 is a block diagram showing the configuration of the first controller 2.

The first controller 2 has a controller 21, a storage 22, an inputter 23, and an outputter 24.

The controller 21 includes a processor such as a central processing unit (CPU) or a micro processing unit (MPU). The controller 21 executes operation such as control, computing, or signal transfer. The controller 21 executes programs stored in the storage 22 to implement various functions. For example, according to the program, the controller 21 reads a signal from, e.g., an input switch via the inputter 23, computes the signal, and outputs a computing result via the outputter 24.

The storage 22 may include a read-only memory (ROM), a random-access memory (RAM), and an auxiliary storage. The storage 22 stores the programs to be executed by the controller 21. Moreover, the storage 22 stores various types of data and various statuses, such as an input/output status, a computing status, and a control progress.

The inputter 23 writes an input signal in an input area of the storage 22. Note that in a case where the input signal is an analog signal, the inputter 23 A/D-converts the input signal to write the converted signal in the input area of the storage 22.

The outputter 24 outputs a signal from an output area of the storage 22. Note that in some cases, the outputter 24 may D/A-convert the signal from the output area of the storage 22 to output the converted signal.

The second controller 3 performs communication in conformity with an Ethernet standard, i.e., the safety communication, with a second device that uses the safety signal. The communication in conformity with the Ethernet standard by the second controller 3 is, for example, communication in conformity with a CIP Safety standard (EtherNet/IP Safety standard). That is, the second controller 3 communicates, i.e., transmits and receives the safety signal, with the second device via the LAN cable 81. For example, the second controller 3 is a safety PLC. The second device is a device that transmits and receives the safety signal in the automated system. In this example, the second device includes the safety IO box 92 and the robot controller 94. The safety communication is, for example, communication standardized in conformity with, e.g., an international standard, and is safety communication based on International Electrotechnical Commission (IEC) 61784-3.

The second controller 3 has a configuration similar to the configuration of the first controller 2 shown in FIG. 3.

The PoE hub 4 is a hub having a PoE power supply function. In this example, the PoE hub 4 has three LAN terminals 41. That is, the PoE hub 4 can receive and output a signal in conformity with the Ethernet standard via the LAN terminal 41. The LAN terminal 41, i.e., the PoE hub 4, is connected so as to receive and output a signal with the first controller 2, the second controller 3, and the touch panel 5. Moreover, the PoE hub 4 supplies power, via the LAN cable 81, to a device connected to the LAN terminal 41 via the LAN cable 81. The PoE hub 4 is one example of a power supplier.

Note that the LAN terminal 41 may be disposed on the control panel 1 and be electrically connected to the PoE hub 4.

The touch panel 5 is disposed on a casing of the control panel 1. With the touch panel 5, a user can perform various types of input operation. For example, the user can set the first controller 2 and the second controller 3 via the touch panel 5. Further, the user can also set the first device and the second device via the touch panel 5.

The AC/DC converter 6 converts AC power into DC power. The control panel 1 includes a power connector 60. A power cable 61 is connected to the power connector 60. The power cable 61 is connected to a commercial power source 62. The AC/DC converter 6 can receive input AC power within a predetermined voltage range. For example, the voltage range includes at least a range of 100 V to 200 V. That is, the AC/DC converter 6 converts an AC power of 100 V to 200 V from the power connector 60 into DC power.

The AC/DC converter 6 supplies the DC power to the first controller 2, the second controller 3, the PoE hub 4, and the touch panel 5.

Further, the control panel 1 includes a DC output terminal 63 that outputs DC power. The control panel 1 supplies DC power with a predetermined voltage (e.g., 24 V) to a device connected to the DC output terminal 63 via a cable.

The switching hub 91, the IO box 93, the robot controller 94, the wireless router 95, and the robot controller 97a of the self-propelled robot 97 are capable of performing the communication in conformity with the Ethernet standard, such as the communication in conformity with the EtherNet/IP standard, with the first controller 2. The switching hub 91, the IO box 93, the robot controller 94, the wireless router 95, and the robot controller 97a of the self-propelled robot 97 are the first devices.

In addition to the safety switch 96, a safety device such as a light curtain may be connected to the safety IO box 92. The safety IO box 92 can receive and output the safety signal. A safety signal from the safety device is input to the safety IO box 92. Moreover, the safety IO box 92 is capable of performing the communication in conformity with the Ethernet standard, such as the communication in conformity with the CIP Safety standard, with the second controller 3.

The robot controller 94 controls operation of a robot (not shown). The robot controller 94 has a safety unit 94a that monitors operation of the robot. The safety unit 94a can receive and output the safety signal. Moreover, the safety unit 94a is capable of performing the communication in conformity with the Ethernet standard, such as the communication in conformity with the CIP Safety standard, with the second controller 3.

The safety IO box 92 and the safety unit 94a are the second devices. That is, the robot controller 94 is not only the first device, but also the second device.

The switching hub 91 and the robot controller 94 are PoE power receiving devices. That is, the switching hub 91 and the robot controller 94 are capable of receiving the power supplied by the PoE power supply via the LAN cables 81.

The control panel 1 is also capable of performing Ethernet communication (i.e., TCP(UDP)/IP communication) other than the communication in conformity with the Ethernet standard by the first controller 2 and the communication in conformity with the Ethernet standard by the second controller 3. For example, the PC 90 is connected to the LAN terminal 41 of the control panel 1 via the LAN cable 81. The control panel 1 implements the Ethernet communication via the PoE hub 4. The PC 90 performs the Ethernet communication with the first controller 2 or the second controller 3. For example, the user can edit the first controller 2 or the second controller 3 via the PC 90. Moreover, the PC 90 performs the Ethernet communication with, e.g., the robot controller 94, thereby checking the status of the robot controller 94 or changing the setting of the robot controller 94.

With this configuration, the control panel 1 can perform the communication in conformity with the Ethernet standard with the first device, i.e., the standard field device such as the robot controller 94, the safety communication in conformity with the Ethernet standard with the second device, the Ethernet communication, and the PoE power supply. These types of communication and power supply can be all performed via the LAN cables 81. Thus, the control panel 1 has the LAN terminals 41. From a different point of view, the control panel 1 may only be required to include the LAN terminals 41, and does not necessarily include other terminals. Note that in this example, the control panel 1 includes the power terminals, i.e., the power connector 60 and the DC output terminal 63, in addition to the LAN terminals 41. That is, for the control panel 1, the types of terminal required and the number of terminals required can be reduced. As a result, the control panel 1 can be reduced in size.

As described above, the control panel 1 includes the first controller 2 that performs the communication in conformity with the Ethernet standard with the first device via the field network, the second controller 3 that performs the safety communication in conformity with the Ethernet standard with the second device that uses the safety signal, the PoE hub 4 (power supplier) that performs the PoE power supply to the first device or the second device, and the LAN terminals 41 to which the first controller 2, the second controller 3, and the PoE hub 4 are connected and to which the LAN cables 81 are connected.

The automated system 100 includes the control panel 1, the first devices, and the second devices.

According to these configurations, the communication with the first device via the field network, the safety communication with the second device, and the power supply to the first device or the second device can be implemented via the LAN cable 81. Thus, the control panel 1 may only be required to include the LAN terminals 41, and the terminals required can be reduced. As a result, the control panel 1 can be reduced in size. Further, only connection via the LAN cables 81 is required for wiring for the control panel 1, and therefore, no complicated wiring is necessary. That is, the number of steps of connecting cables to the control panel 1 can be reduced. The LAN cable 81 is a general-purpose widespread cable. That is, the cables required for wiring for the control panel 1 are easily obtained.

Specifically, the first controller 2 performs the communication in conformity with the EtherNet/IP standard.

The second controller 3 performs the communication in conformity with the EtherNet/IP Safety standard.

According to these configurations, both of these standards are an open industrial Ethernet standard, and uses a standard Ethernet, and therefore, future technology development is expected. Further, the control panel 1 can follow such development. In addition, both of these standards are in conformity with the Ethernet standards, and therefore, a general-purpose Ethernet device can be utilized.

The control panel 1 further includes the touch panel 5 that is used to set the first controller 2 and the second controller 3.

According to this configuration, the setting can be more flexibly made via the touch panel 5 as compared to a configuration in which the control panel 1 includes a simple button. That is, as described above, the devices can be connected to the control panel 1 via the LAN cables 81, and therefore, various devices can be connected to the control panel 1. Since the control panel 1 includes the touch panel 5, the setting can be flexibly made corresponding to the devices connected to the control panel 1.

The control panel 1 further includes the power terminal that receives and/or outputs power, i.e., the power connector 60 and the DC output terminal 63, and the terminal of the control panel 1 to which the cable is connected from the outside includes only the LAN terminal 41 and the power terminal.

According to this configuration, the wiring required for the control panel 1 is only the wiring via the LAN cables 81 and the power cable (e.g., the power cable 61), and therefore, the steps of connecting the cables to the control panel 1 can be reduced.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the devices directly or indirectly connected to the control panel 1 are not limited to the devices 90 to 98. Any device equivalent to the first device that performs the communication in conformity with the Ethernet standard via the field network may be connected to the control panel 1. Moreover, any device equivalent to the second device that uses the safety signal and performs the communication in conformity with the Ethernet standard, i.e., the safety communication, may be connected to the control panel 1.

The communication by the first controller 2 is not limited to the communication in conformity with the EtherNet/IP standard. The communication by the first controller 2 may only be required to be the communication in conformity with the Ethernet standard, and for example, be communication in conformity with a PROFINET standard, an EtherCAT (registered trademark) standard, or a CC-Link IE (registered trademark) standard.

The communication by the second controller 3 is not limited to the communication in conformity with the CIP Safety standard. The communication by the second controller 3 may only be required to be the safety communication in conformity with the Ethernet standard with the device that uses the safety signal, and for example, be communication in conformity with a Safety over EtherCAT standard or a CC-Link IE Safety standard.

The control panel 1 may include a terminal other than the LAN terminal 41. The technique disclosed herein aims to reduce the minimum required terminals for the control panel, and does not aim to exclude an additional terminal other than the LAN terminal in the control panel.

The control panel 1 includes the power connector 60 and the DC output terminal 63 as the power terminals. However, only the power connector 60 may be disposed as the power terminal.

The invention claimed is:
1. A control panel for an automated system, comprising:
a first controller that performs non-safety communication in conformity with an Ethernet standard with a first device via a field network;
a second controller that performs safety communication in conformity with an Ethernet standard with the first device and/or a second device that uses a safety signal;
a power supplier that performs power-over-Ethernet (POE) power supply to the first device or the second device;
a first local area network (LAN) terminal to which the first controller and the power supplier are connected and to which a first LAN cable is connected; and a second LAN terminal to which the second controller and the power supplier are connected and to which a second LAN cable is connected.

2. The control panel for the automated system according to claim 1, wherein
the first controller performs communication in conformity with an EtherNet/IP standard.

3. The control panel for the automated system according to claim 1, wherein
the second controller performs communication in conformity with an EtherNet/IP Safety standard.

4. The control panel for the automated system according to claim 1, further comprising:
a touch panel that is used to set the first controller and the second controller.

5. The control panel for the automated system according to claim 1, further comprising:
a power terminal that receives and/or outputs power,
wherein a terminal of the control panel to which a cable is connected from an outside includes only the first LAN terminal and the power terminal.

6. A robot system comprising:
a first device;
a second device that uses a safety signal; and
a control panel having
a first controller that performs non-safety communication in conformity with an Ethernet standard with the first device via a field network;
a second controller that performs safety communication in conformity with an Ethernet standard with the first device and/or the second device;
a power supplier that performs power-over-Ethernet (POE) power supply to the first device or the second device;
a first local area network (LAN) terminal to which the first controller and the power supplier are connected and to which a first LAN cable is connected; and
a second LAN terminal to which the second controller and the power supplier are connected and to which a second LAN cable is connected.

7. The robot system according to claim 6, wherein
the first device is a switching hub,
the second device is a safety IO box, and
the robot system further comprises:
a safety switch connected to the safety IO box,
an IO box connected to the switching hub,
a robot controller connected to the switching hub,
a wireless router connected to the switching hub, and
a plurality of self-propelled robots connected to the wireless router.

* * * * *